US009453496B2

(12) United States Patent
Farb et al.

(10) Patent No.: US 9,453,496 B2
(45) Date of Patent: Sep. 27, 2016

(54) MANUFACTURE OF WIND TURBINE ENHANCEMENT SYSTEMS

(75) Inventors: Daniel Farb, Beit Shemesh (IL); Gadi Hareli, Beit Shemesh (IL); Joe Van Zwaren, Beit Shemesh (IL); Ken Kolman, Beit Shemesh (IL); Avner Farkash, Beit Shemesh (IL)

(73) Assignee: LEVIATHAN WIND FARM AERODYNAMICS LTD., Beit Shemesh (IL)

( * ) Notice: Subject to any disclaimer, the term of this patent is extended or adjusted under 35 U.S.C. 154(b) by 1099 days.

(21) Appl. No.: 13/322,580

(22) PCT Filed: May 26, 2010

(86) PCT No.: PCT/IB2010/052335
§ 371 (c)(1),
(2), (4) Date: Nov. 28, 2011

(87) PCT Pub. No.: WO2010/136976
PCT Pub. Date: Dec. 2, 2010

(65) Prior Publication Data
US 2012/0068470 A1    Mar. 22, 2012

Related U.S. Application Data

(60) Provisional application No. 61/180,949, filed on May 26, 2009, provisional application No. 61/224,925, filed on Jul. 13, 2009, provisional application No. 61/244,083, filed on Sep. 21, 2009.

(51) Int. Cl.
F03D 3/06    (2006.01)
F03D 1/04    (2006.01)
(Continued)

(52) U.S. Cl.
CPC ............... *F03D 3/061* (2013.01); *F03D 1/04* (2013.01); *F03D 3/062* (2013.01); *F03D 11/04* (2013.01); *F05B 2220/7068* (2013.01); *F05B 2240/301* (2013.01); *F05B 2240/40* (2013.01); *F05B 2250/71* (2013.01); *F05B 2280/5008* (2013.01);
(Continued)

(58) Field of Classification Search
CPC .......... F03D 1/04; F03D 3/04; F03D 3/0427; F03D 3/049; F05B 2240/13; F05B 2240/131; F05B 2240/133
USPC ......................................... 415/4.5, 908, 914
See application file for complete search history.

(56) References Cited

U.S. PATENT DOCUMENTS

| 4,018,543 A | * | 4/1977 | Carson et al. | 415/208.2 |
| 4,353,946 A | * | 10/1982 | Bowers | 428/109 |
| 6,448,668 B1 | * | 9/2002 | Robitaille | 290/54 |
| 2002/0114692 A1 | * | 8/2002 | Boughton | 415/4.5 |

(Continued)

FOREIGN PATENT DOCUMENTS

WO    WO 2008010200 A2  *  1/2008

OTHER PUBLICATIONS

Frost, Wind Characteristics Over Complex Terrain Relative to WECS Siting, Journal of Energy, vol. 5, No. 5 (Sep.-Oct. 1981), pp. 263-269.*

*Primary Examiner* — Dwayne J White
*Assistant Examiner* — Joshua R Beebe
(74) *Attorney, Agent, or Firm* — Mark M. Friedman

(57) ABSTRACT

Aspects of the manufacturing of Flow Deflection Devices (FDDs) for wind turbines are presented as a system that requires adjustments in order to improve power output and adjust for changes in different conditions yet provides stability of shape.

8 Claims, 5 Drawing Sheets

(51) Int. Cl.
*F03D 7/02* (2006.01)
*F03D 11/04* (2006.01)

(52) U.S. Cl.
CPC ............... *Y02E 10/28* (2013.01); *Y02E 10/728* (2013.01); *Y02E 10/74* (2013.01); *Y02P 70/523* (2015.11)

(56) References Cited

U.S. PATENT DOCUMENTS

2005/0283323 A1* 12/2005 Anderson .............. G01N 13/00
  702/50
2009/0297332 A1* 12/2009 Boyd ................................ 415/1

* cited by examiner

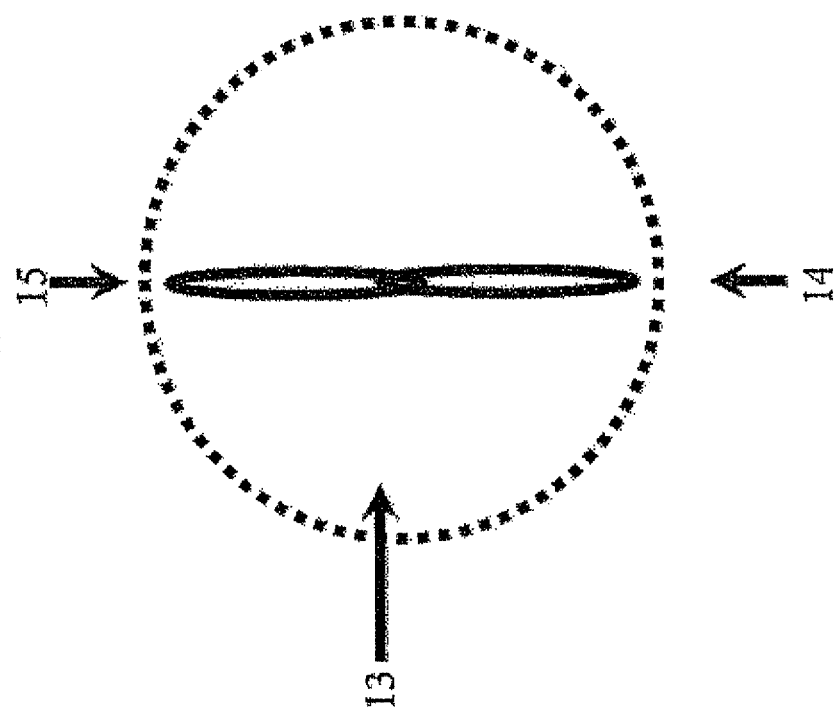

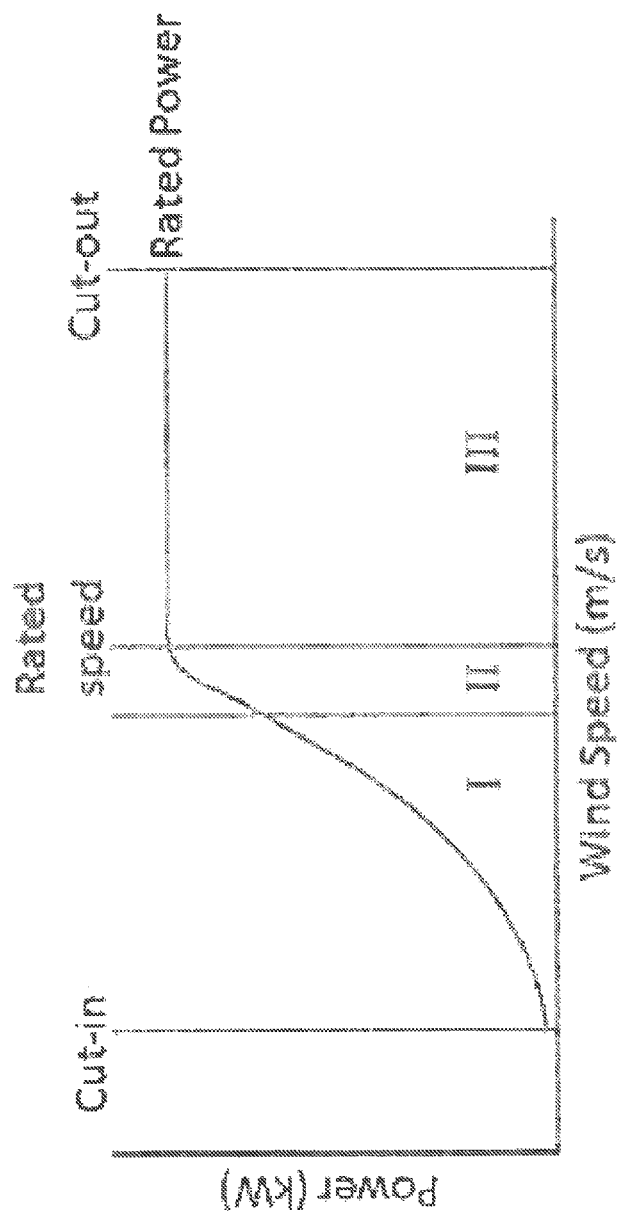

MANUFACTURE OF WIND TURBINE ENHANCEMENT SYSTEMS

FIELD AND BACKGROUND OF THE INVENTION

The present invention relates to an FDD that is used to enhance power output or otherwise affect the operation of a wind turbine.

A previous patent of the author (IB2009/050578, FLOW DEFLECTION DEVICE CONSTRUCTION) referred to the use of earth as part of the production of an FDD. The current application differs by adding on the use of a shell to maintain the shape of the earth. The stability of shape is an essential prerequisite for the other claims of this patent application for applying that stability to the direction of the shear layer and the directionality of the wind.

Another previous patent of the author (1L2007/000348, Flow Deflection Devices and Methods for Energy Capture Machines) disclosed the use of FDDs of different shapes to improve the speed of wind at the blades. That patent does not deal at all with the use of an FDD to affect the shear layer and the maintenance of the turbine. That subject is new to this patent application.

SUMMARY OF THE INVENTION

It is now disclosed for the first time a system for enhancing energy output from a turbine, comprising: a. a wind turbine, b. an FDD (flow deflection device), with an axis perpendicular to the flow of the wind, for a turbine, "for" defined as positively affecting the power output or stability of the turbine, composed of earth in an alteration of the landscape, whether provided before or after the installation of the turbine, and, c. a shell on at least one outer surface, said shell defined as a substance that holds the shape of the FDD.

The system is such that the shell substance is an organic material, such as grass.

The system is such that the shell substance is a substantially smooth inorganic material.

The system is such that the shell is attached to the ground.

The system is such that the shell comprises horizontal or vertical strips.

It is now disclosed for the first time a system of producing wind power, comprising: a. a turbine, b. an FDD functionally adjacent to said turbine in a specific location, wherein the flow of wind past the FDD into the swept area of the blades varies by no more than 2 meters per second in at least one orientation of the blades for a turbine of over 40 to 60 meters diameter, 3 meters per second for a turbine of over 60 to 100 meters diameter, 3.5 meters per second for a turbine of over 100 to 140 meters diameter, and 4 meters per second for over 140 meters diameter.

It is now disclosed for the first time a system of producing wind power, comprising: a. a turbine, and, b. An FDD functionally adjacent to said turbine in a specific location, wherein the flow of wind over the FDD into the swept area of the blades maintains a shear layer inferior to the blades at their lowest point.

It is now disclosed for the first time a system of producing wind power, comprising: a. a turbine, in a location of directional wind, defined as 60% or more of wind in a particular location coming from "x" degrees or less contiguous directionality, and, b. an FDD, functionally adjacent to said turbine, wherein the perimeter of the FDD is substantially x plus 45 degrees or less in the area of the directional wind. The reason for the qualification "or less" is in case x degrees of are includes 75%, for example, of the wind, and the builder chooses to include only 60% in the FDD.

It is now disclosed for the first time a system of producing wind power, comprising: a. a turbine, in a location of unidirectional wind, defined as 60% or more of wind in a particular location coming from 90 degrees or less contiguous directionality, and, b. an FDD, functionally adjacent to said turbine, wherein the perimeter of the FDD is shaped as a greater radius of arc than a circle.

It is now disclosed for the first time a use for an FDD to decrease stress on the blades and drive train of a wind turbine, wherein the FDD is placed adjacent to the turbine in a specific location in order to increase the uniformity of wind speed from the bottom of the swept area to the top of the swept area, over that of the normal distribution of wind speed differences at a particular height and location.

It is now disclosed for the first time a method of manufacturing an FDD-wind turbine system, wherein a zone of the 30% highest velocity area of wind centers over the blades when hitting the blades from any of several directions over an FDD whose length is at least that of the blade diameter.

It is now disclosed for the first time a system for wind energy output, comprising: a. a turbine, and, b. an FDD, wherein said system has a rated speed less than what it would be without the FDD.

It is now disclosed for the first time a method of manufacturing a wind turbine system, wherein an FDD in functional contiguity to the turbine is combined with a generator that operates at a lower speed than the rated speed of the same turbine without the FDD.

It is now disclosed for the first time a method of directing the shear layer proceeding from an FDD in relationship to a wind turbine, comprising: a. a microprocessor with memory that inputs at least the following parameters in a system for outputting wind velocity over a variety of points in relation to a turbine: internal diameter of the FDD, upper and lower height of the FDD, angle of the FDD, shape of the FDD, turbine geometry, landscape geometry, and, b. providing an FDD in accordance with the output of said microprocessor so that the shear layer in the FDD's direction of wind is inferior to the turbine blades.

BRIEF DESCRIPTION OF THE DRAWINGS

The invention is herein described, by way of example only, with reference to the accompanying drawings, wherein:

FIG. 4 is a diagram of the swept area of a wind turbine.

FIG. 5 is a diagram of a power curve.

DESCRIPTION OF THE PREFERRED EMBODIMENTS

The present invention relates to placing flow-enhancement objects or flow deflection devices, called FDDs, in relationship to turbines, usually wind turbines. The language of wind turbine is used here because that is its most likely application, but it does not limit the invention to wind. The central issue addressed here is how to make them economically, and, by making them, what are the implications for adjustments in the whole system of power production from large wind turbines, as in a wind farm. This patent application views the issue as a systems approach.

Definition: axis can refer even to a straight-line object if it is an approximation of a slowly curving circle or ellipse with an axis.

The principles and operation of a FDD for a turbine according to the present invention may be better understood with reference to the drawings and the accompanying description.

Figure 1:
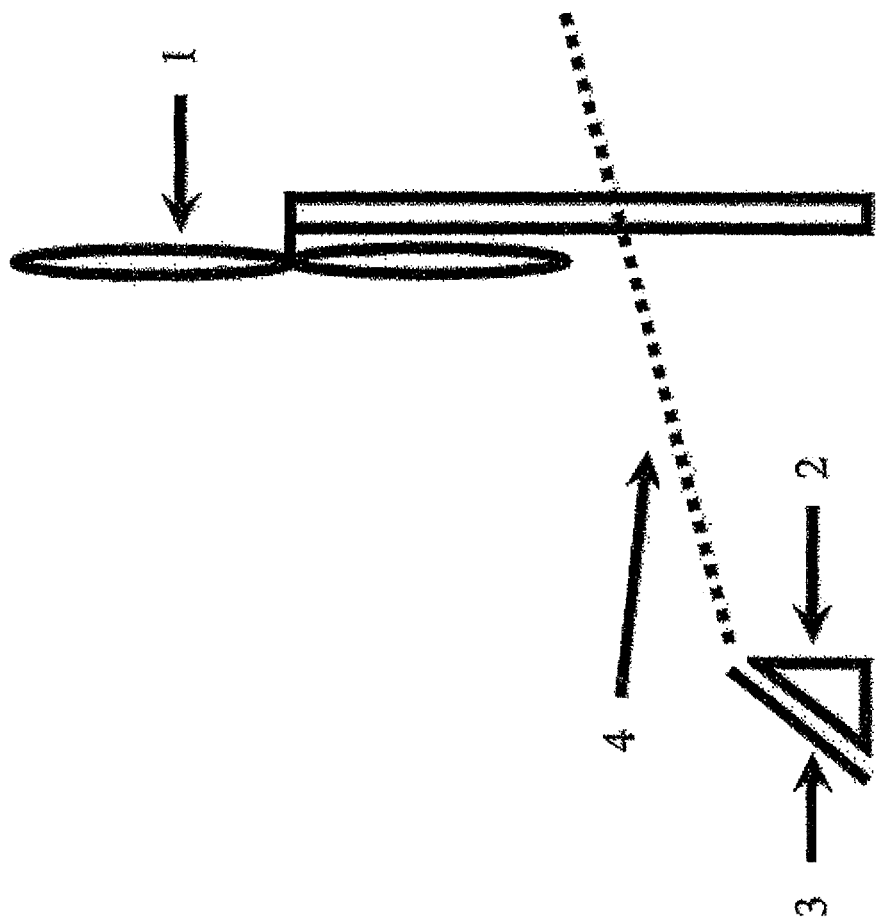
FIG. 1 is a diagram of a flow deflection object mound and shell.

Referring now to the drawings, FIG. 1 illustrates an FDD mound and shell. The key point is the manufacture from earth. A wind turbine with blades (1) is in functional proximity to an FDD made of earth (2). A shell (3) or covering is placed on top of the earth to maintain its shape. This is an important step, because the smoothness and maintenance of the specifications of the design are crucial in achieving an aerodynamic result. This can be any kind of shape-retention material, such as well-cut grass with adequate roots, plastic, concrete, or a soft material that can be made harder. In the embodiment of concrete, in one embodiment the method of manufacturing is then to smooth the concrete.

The shell may, in one embodiment, then be attached to the ground, in some cases with piles, bolts, or concrete.

In the use of a system to determine the placement of an FDD near a wind turbine with an axis perpendicular to the wind flow, we present the use of varying the internal diameter, the FDD lower and upper height, and the shape and angle of the FDD, in order to keep the shear layer (4) below the tips of the blades at their lowest spot. The FDD affects the shear layer as shown and causes it to proceed from the FDD at a gradual increase in elevation. This shear layer can be determined by computational fluid dynamics analysis or by wind speed measurements, and is defined as a thin layer separating the low velocity inferior wind from much higher velocity superior wind. A more numerical definition of a shear layer for the purposes of this patent application might be, as an example, a change in wind velocity of 0.5 meters or more within a vertical distance of 10 meters. This is offered not to restrict the invention, but rather to provide an example. Practitioners skilled in the art of wind conditions will understand the definition of a shear layer. Other significant parameters are turbine geometry, land geometry, and the angle and shape of the FDD.

It is well known to wind experts that turbine problems can occur when the shear layer cuts across a blade.

The manufacturing of a structure based on material may be by use of many horizontal or vertical strips.

Figure 2:
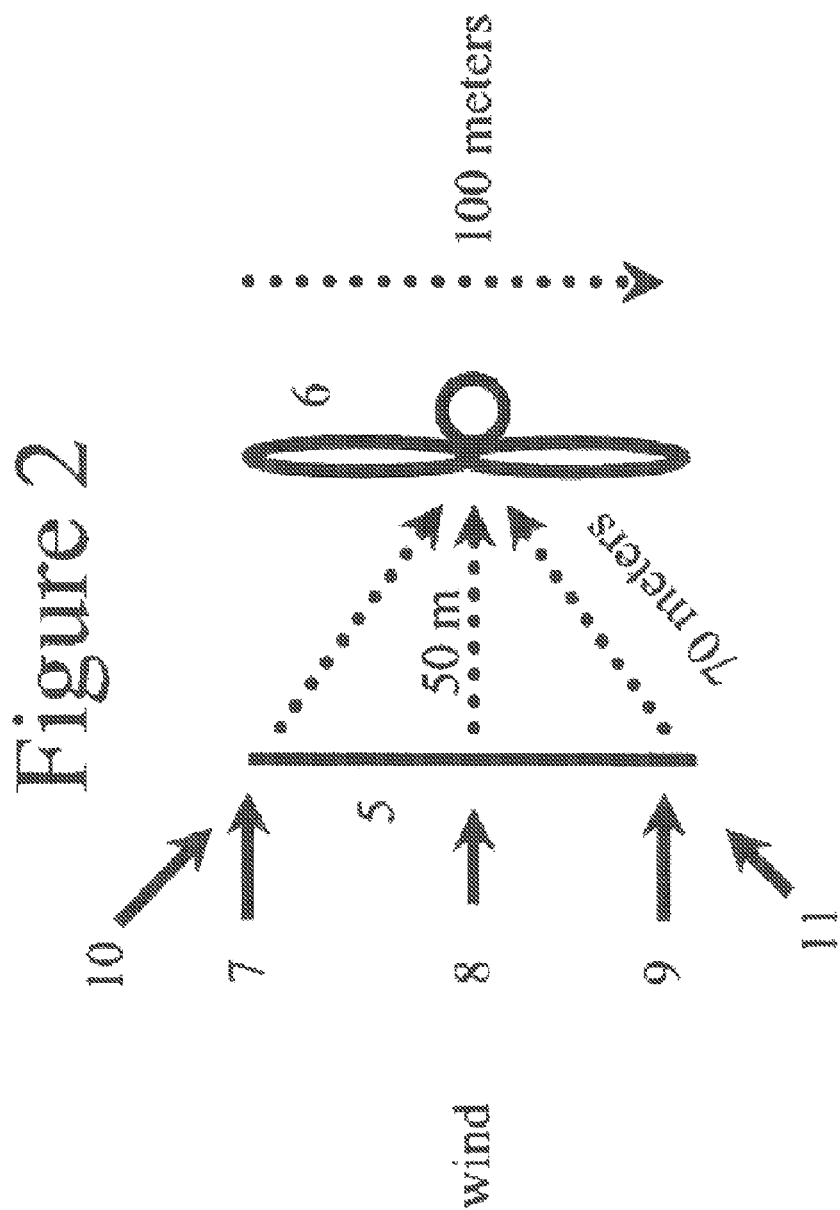
FIG. 2 is a diagram of the method of centering an FDD.

For an FDD that improves the power output of a large wind turbine, there are occasions when the wind comes mostly from a very restricted direction. In that case, as in FIG. 2, the FDD (5) can be a low-angle ellipse (defined as a circumference around the turbine pole that would extend to a larger area than that of a circle) or straight instead of circular. FIG. 2 shows that the goal is to make the calculated high velocity area center over the blades when hitting the blades from several directions over an FDD. For example, in FIG. 2, the FDD (5) has edges (7) and (9) and center (8). The blade span is 100 meters and the FDD with a span of 100 meters is located 50 meters from the turbine center. The distance from the FDD edges to the turbine center is 70 meters. The process of centering involves finding the best way to create higher velocity wind on the turbine blades. If the wind comes from directions (10) through (11) in the case of most of the wind coming from a 90-degree arc, then the FDD will create an area of high velocity in the swept area of the blades.

Figure 3:
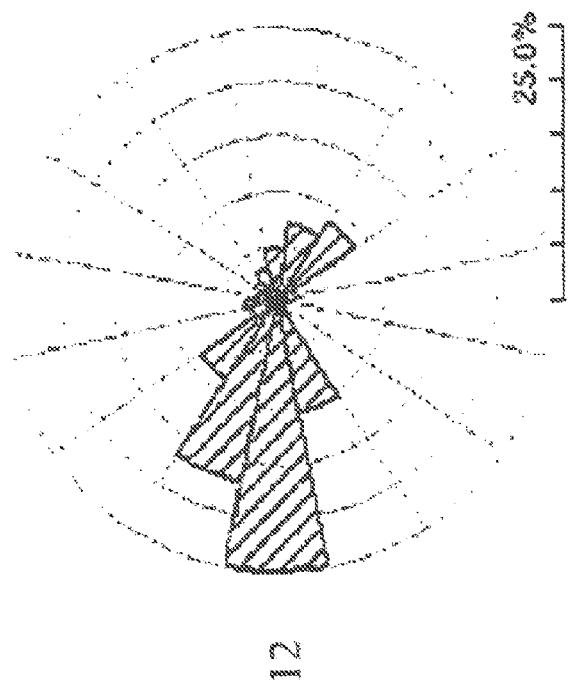
FIG. 3 is a diagram of a wind rose.

FIG. 3 is a wind rose (12) that illustrates how sometimes the wind into a turbine comes predominantly from one direction, in this case from the west.

FIG. 4 illustrates the swept area (13) of a turbine with lowest point (14) and highest point (15). Normally the wind speed varies by 3-4 meters per second over a distance of 100 meters. Placing an FDD near such a turbine, if properly situated, will result in a decrease of the speed differential from point (14) to (15). Any such reduction improves the turbine maintenance by making the forces more uniform. It is well known in the art that such a differential is a major problem in drive train maintenance and lifespan.

The invention can also be defined in absolute terms as follows: the device and method of placing an FDD near a wind turbine, in one embodiment a horizontal axis wind turbine, such that the flow of wind into the swept area of the blades in a specific location facing the flow of wind, wherein the flow of wind past the FDD into the swept area of the blades varies by no more than 2 meters per second in at least one orientation of the blades for a turbine of over 40 to 60 meters diameter, 3 meters per second in at least one orientation of the blades for a turbine of over 60 to 100 meters diameter, 3.5 meters per second for a turbine of over 100 to 140 meters diameter, and 4 meters per second for 140 meters and above.

The current application presents a new use for such a structure in addition to improving the power output: decreasing the strain on the gearbox by making uniform wind enter the turbine blade areas.

The FDD is ideally manufactured and adjusted in concert with turbine parameters as well.

The manufacturing of a turbine is according to parameters of the generator and drive train needed to accommodate the mean wind speed. Presented here is a new system and method of manufacturing, incorporating the use of an FDD, whereby the change in effective velocity, defined as the difference between the normal cut-in speed of the turbine and the new cut-in speed after the FDD is added, is added to the normal wind speed to make a corrected wind speed to which point the turbine parameters are manufactured. Another way of defining the parameters is that the maximum power in the power curve should be at 11.5 meters per second or below or at 11.0 meters per second or below.

FIG. 5 illustrates a power curve. Define for our purposes the "rated speed" as the speed at which the minority of power production occurs above the rated speed. To match the effect of an FDD, the rated speed should be decreased by at least 0.5 m/s from the situation where there is no FDD. Similarly, the minimum production of power from the generator should be adjusted to occur at least 0.5 m/s less than when there is no FDD.

While the invention has been described with respect to a limited number of embodiments, it will be appreciated that many variations, modifications and other applications of the invention may be made.

What is claimed is:

1. A method for creating a uniform wind environment in the swept area of the blades of a turbine comprising:
   providing a turbine including a plurality of blades;
   placing a flow deflection device (FDD) unconnected and functionally proximate to the turbine to create a shear layer, said FDD extending in height above the base of the turbine and not including a base to the turbine; and,
   orienting the flow deflection device from its base to its top at an acute angle to the turbine to direct the shear layer below the swept area of the blades and increased velocity in the swept area of the blades to create a wind flow of a substantially uniform velocity across the swept area of the blades of the turbine when facing the wind and the FDD.

2. The method of claim 1, wherein the placing of the FDD proximate to the turbine is such that the flow of wind past the FDD into the swept area of the blades varies by no more than 2 meters per second in at least one orientation of the blades for a turbine of over 40 to 60 meters diameter, 3 meters per second in at least one orientation of the blades for a turbine of over 60 to 100 meters diameter, 3.5 meters per second for over 100 to 140 meters diameter, and 4 meters per second for over 140 meters diameter and above.

3. The method of claim 1, wherein the providing of the turbine includes locating the turbine in unidirectional wind, defined as 60% or more of wind in a particular location, coming from 90 degrees or less, symbolized by "x", contiguous directionality along an arc at least partially surrounding the turbine, and further providing a perimeter to said flow deflection device, and wherein the perimeter of the said device extends substantially x plus 45 degrees or less along said arc from the area of the unidirectional wind.

4. The method of claim 1, wherein the FDD has a length at least that of the blade diameter.

5. The method of claim 1, further positioning the device in such a manner that the uniformity of wind speed from below the swept area of the blades to at least the top of the swept area of the blades is greater than that of the normal distribution of wind speed differences at a particular height and location.

6. The method of claim 1, wherein the FDD includes earth.

7. A method for creating an FDD design for uniform wind environment and increased velocity in the swept area of the blades of a turbine comprising:
providing a processor and a memory for storing machine executable instructions to be executed by the processor, the processor programmed with data for at least one selected parameter of: internal diameter of a flow deflection device (FDD), upper and lower height of the FDD, angle of the FDD, shape of the FDD, geometry of the turbine, and geometry of the landscape;
inputting the at least one selected parameter into the processor; and,
generating a design, for the FDD and the turbine in relation to each other its spatial relationship to the turbine, wherein the FDD extends higher than the base of the turbine and the slant of the FDD is in the direction of the turbine at an acute angle from its base to its top, based on the inputted at least one selected parameter, to cause substantially uniform wind flow in the swept area of the blades and to direct the shear layer beneath the blades.

8. The method of claim 7, additionally comprising programming the processor with at least one selected output condition from the group of: the flow of wind past the turbine into the swept area of the blades varies by no more than 2 meters per second in at least one orientation of the plane of the blades for a turbine of over 40 through 60 meters diameter, 3 meters per second in at least one orientation of the blades for a turbine of over 60 through 100 meters diameter, 3.5 meters per second for over 100 through 140 meters diameter, and 4 meters per second for over 140 meters diameter and above.

\* \* \* \* \*